Oct. 19, 1954 H. T. LAMB 2,692,123
MIXING MACHINE FOR MIXING DOUGH AND OTHER MIXTURES
Filed Oct. 22, 1951 2 Sheets-Sheet 1
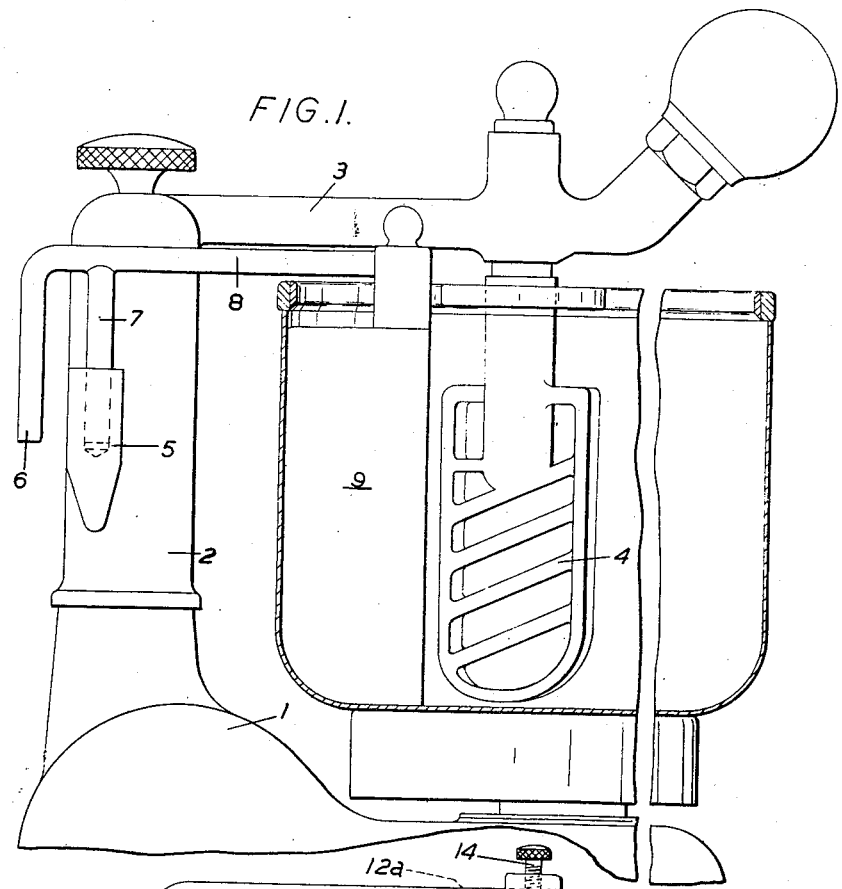
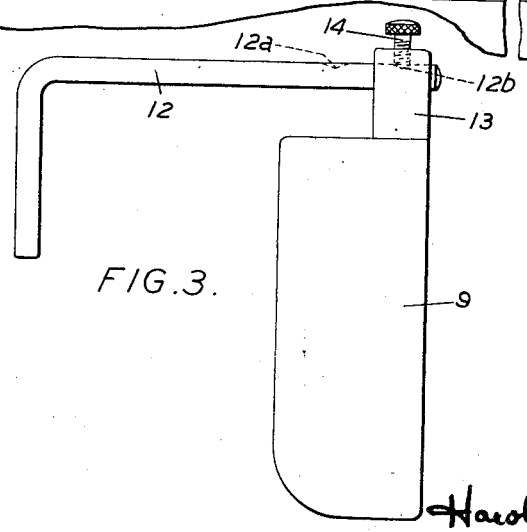
Inventor
Harold Thomas Lamb
By Alexander Dowell
Attorneys Oct. 19, 1954  H. T. LAMB  2,692,123
MIXING MACHINE FOR MIXING DOUGH AND OTHER MIXTURES
Filed Oct. 22, 1951  2 Sheets-Sheet 2
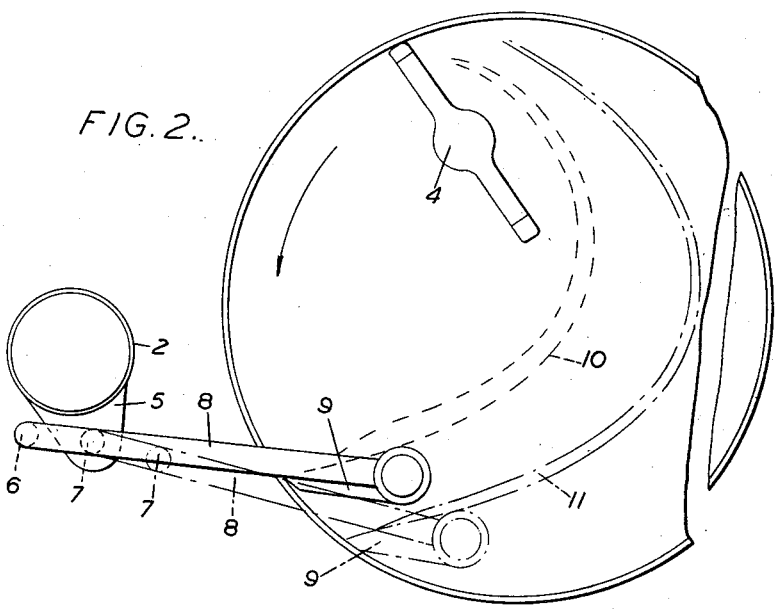
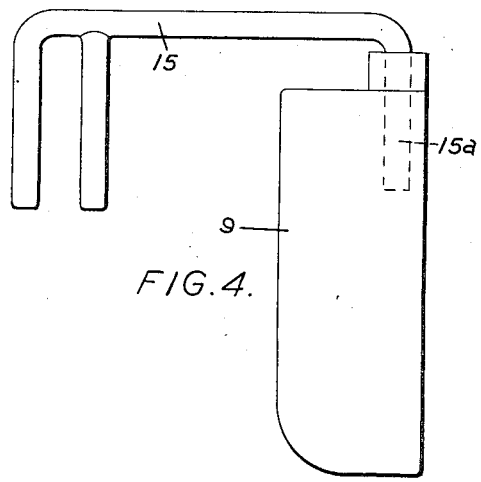
Inventor
Harold Thomas Lamb
By Alexander Powell
Attorneys Patented Oct. 19, 1954

2,692,123

UNITED STATES PATENT OFFICE 2,692,123

MIXING MACHINE FOR MIXING DOUGH AND OTHER MIXTURES

Harold Thomas Lamb, Newcastle upon Tyne, England

Application October 22, 1951, Serial No. 252,474

Claims priority, application Great Britain October 27, 1950

1 Claim. (Cl. 259—85)

This invention relates to machines for mixing dough and other mixes of the kind comprising a dolly which is adapted to co-operate with the side of a rotating bowl to effect mixing, and a scraper arm having a vertical pin portion for pivotal mounting in a vertical socket on the frame or base of the machine, for removing the mixture from the side of the bowl to the inner portion to ensure that the whole mix is operated on by the dolly.

It has been found with mixes of varying consistencies that according to the dimensions of the dolly and the quantity of the mix more or less of the mix tends to accumulate in the centre of the bowl and form a static mass which is not properly mixed. The object of the present invention is to provide a simple device whereby such tendency may be readily obviated in a simple manner, whatever be the dimensions of the dolly, or the quantity of the mix.

According to the invention means are provided for varying the length of the arm on which the mixing blade is suspended so that the mix may be deflected from the side of the bowl at varying distances from the point where the dolly is operating. The effect of this is that when the kind of dolly or the quantity of the mix is such that a relatively small volume is swept out so that there is a relatively large static area in the middle of the bowl with the scraper arm in the normal fixed position, by shortening the scraper arm the mix may be caused to leave the side of the bowl earlier with the result that more of the mix is deflected into the area operated on by the dolly and the central static area reduced or entirely eliminated, and a good quality homogeneous mix obtained.

Experiments show that the vertical outline imparted to the dough as it is scraped from the side of the bowl is substantially parabolic, the parabola tending to become flatter and shorter as the scraper arm is shortened, so that ultimately by suitably varying of the length of the scraper arm the mass of dough may be caused to be entirely worked upon by the dolly without leaving any static mass.

According to one form of the invention one or more vertical pins in addition to the normal pin for engaging in the vertical socket may be secured to the horizontal scraper arm, the said pins being spaced apart to correspond with the desired path of the dough for particular dollies, so that by inserting one or other of the vertical pins in the vertical socket the effective length of the scraper arm may be varied.

According to another form of the invention there may be formed along the outer portions of the horizontal scraper arm a series of recesses with which is adapted to engage a set bolt in threaded engagement with a threaded bore which intersects a plain bore formed at right angles to a cylindrical block on which is mounted the scraper arm, the distance between the recesses corresponding with the dimensions of the particular form of dolly used. In this form adjustment is effected by slackening off the set bolt, sliding the scraper block along the arm into the desired position and tightening the set bolt. Alternatively, an axial groove may be formed on the horizontal scraper arm instead of the series of recesses.

The invention will now be described by way of example with reference to the accompanying drawings which show different forms of scraper arm.

In the said drawings:

Fig. 1 is an elevation partly in section of the upper portion of a mixing machine.

Fig. 2 is a plan of Fig. 1, which is semi-diagrammatic, and omits the swinging arm.

Fig. 3 is an elevation of another form of scraper arm.

Fig. 4 is an elevation of a further form of scraper arm.

Referring more particularly to Figs. 1 and 2, 1 is the machine housing and 2 the vertical sleeve supported by a vertical pillar rising from the housing, and from which extends the horizontal swinging arm 3 for supporting the dolly 4 which is adapted to rotate thereon. On the side of the sleeve 2 and integral therewith is a vertical boss 5 which is vertically bored to receive one of two vertical pins 6, 7 projecting from a horizontal scraper arm 8 which at the end remote from the said pins has rigidly secured to it a vertical scraper 9.

For a small mix, and using the same dolly, the inner pin 7 is inserted in the boss 5. The scraper 9 taking up the position shown in full lines in Fig. 2, this position causing the mix to take the course indicated by broken lines 10, from which it will be seen that the mix is deflected to nearer the centre of the bowl so that the central area of mix is reduced. When a larger mix is used with the same dolly, the pin 6 is inserted into the boss 5, with the result that the mix leaves the side of the bowl later and follows the longer parabolic path indicated in chain lines 11.

Fig. 3 shows a modified form in which the scraper arm 12 is L-shaped, the adjustment of the scraper 9 being effected by slidably mounting it by means of cylindrical block 13 on the horizontal portion of the arm which has two recesses at 12a, 12b, with which engages a set bolt 14 in a threaded bore which intersects a plain transverse bore in the block 13.

Fig. 4 shows a similar arrangement to that shown in Figs. 1 and 2, but with the difference that the scraper 9 is supported on the one arm 15a of a rectangular U-shaped scraper arm 15. With this construction the bending stress is transferred from the scraper 9 to the U-arm 15a.

What I claim is:

As an article of manufacture for use in a mixing machine of the kind comprising a rotatable dolly which is adapted to cooperate with the inner wall of a rotatable bowl to effect mixing, a frame, a vertical socket on said frame, a scraper arm comprising a horizontal portion, a plurality of vertical pins on said horizontal portion adapted to be pivotally mounted in said vertical socket, a vertical scraper blade depending from the free end of said horizontal portion, said blade being adapted to be pressed against the inner wall of the mixing bowl by the mixture so as to deflect it from said wall, the said pins being spaced apart to correspond with the desired path of the dough for particular dollies, so that by inserting one or another of the vertical pins in the vertical socket the effective length of the scraper arm may be varied.

References Cited in the file of this patent

UNITED STATES PATENTS

| Number | Name | Date |
|---|---|---|
| 414,632 | Crail | Nov. 5, 1889 |
| 1,302,923 | Hills | May 6, 1919 |

FOREIGN PATENTS

| Number | Country | Date |
|---|---|---|
| 66,297 | Norway | May 10, 1941 |